UNITED STATES PATENT OFFICE.

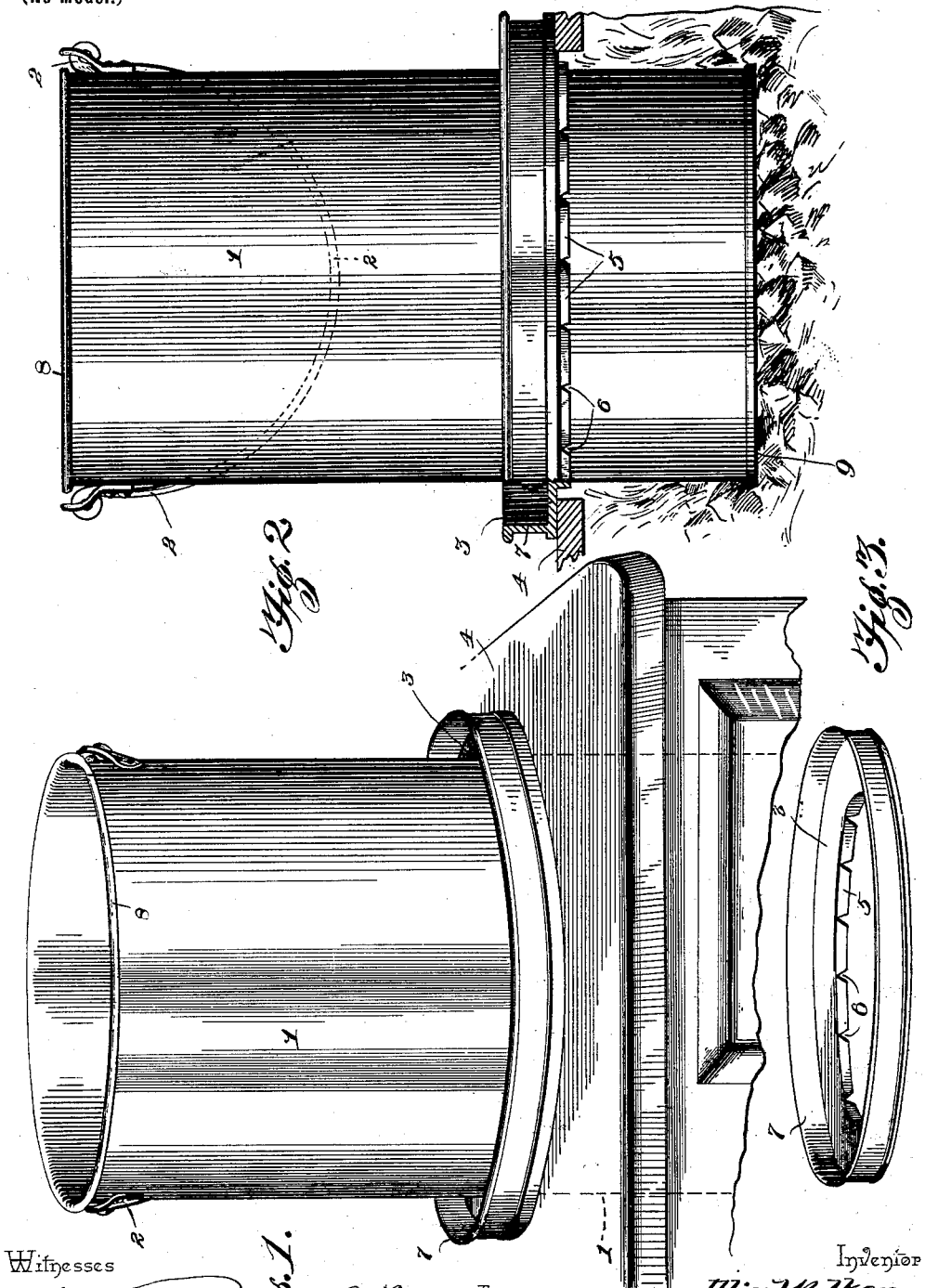

ALICE WELKER, OF WAYNE, NEBRASKA.

COOKING UTENSIL.

SPECIFICATION forming part of Letters Patent No. 661,652, dated November 13, 1900.

Application filed March 26, 1900. Serial No. 10,199. (No model.)

*To all whom it may concern:*

Be it known that I, ALICE WELKER, a citizen of the United States, residing at Wayne, in the county of Wayne and State of Nebraska, have invented a new and useful Cooking Utensil, of which the following is a specification.

This invention relates to cooking utensils, and has for its object to provide an improved device of this character which is especially designed for boiling purposes, and also to provide means for adjustably supporting the pot or receptacle within a stove-hole, so that the distance between the bottom of the utensil and the fire or bed of coals may be varied to suit the requirements of any particular cooking by increasing or diminishing the area of the utensil which is exposed to the heat of the fire. It is furthermore designed to provide means for receiving the water which may boil over through the upper open end of the utensil and prevent such water or other liquid from dropping upon the top of the stove and from gaining access to the fire through the stove-hole.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a perspective view of a cooking utensil constructed in accordance with the present invention and shown supported upon a stove. Fig. 2 is a sectional elevation thereof. Fig. 3 is a detail perspective view of the adjustable supporting-flange.

Corresponding parts in the several figures of the drawings are designated by like characters of reference.

Referring to the drawings, 1 designates the body of the utensil, which is in the form of an ordinary iron pot or a tin pail, having diametrically opposite parallel outer sides or walls, a closed bottom, and an open top, and the usual bail-handle 2.

In carrying out the invention there is provided an outwardly-directed marginal supporting-flange 3, which adjustably embraces the body of the utensil, so that it may be adjusted longitudinally thereon, and is designed to form a support to rest upon the top of a stove 4, and thereby permit the lower portion of the utensil to project downwardly through the stove-hole and adjacent to the fire. At the inner edge of this supporting flange or ring is a pendent marginal rim 5, which is provided with a plurality of inverted substantially V-shaped notches 6, so as to form a spring-rim to frictionally embrace the body of the utensil, and thereby hold the supporting flange or ring at any desired adjustment between the opposite ends of the utensil. By this arrangement it will be apparent that the supporting flange or ring may be raised or lowered upon the utensil, so that the bottom portion thereof may project more or less into the interior of the stove in order that the bottom of the utensil may be adjusted toward or away from the fire, thereby varying the area exposed to the heat of the fire, so as to accommodate the utensil to any particular character of cooking.

The outer edge of the supporting-ring is provided with an upstanding stiffening and strengthening marginal rim 7, which is spaced outwardly from the exterior walls of the utensil, so that any liquid which may boil over upon the outside af the utensil will fall upon the flat ring and be confined thereon by means of the upstanding rim, whereby such liquid is prevented from contacting with the top of the stove and also from gaining access to the interior of the stove and the fire through the stove-hole.

The opposite ends of the utensil are provided with the usual outwardly-directed beads or flanges 8 and 9, which form stops to limit the outward adjustment of the supporting-ring in opposite directions, so as to prevent loss of said ring.

From the foregoing description it will be apparent that the present invention provides simple and efficient means for adjustably supporting a pot or pail within a stove-hole, so that the utensil may be accommodated to the height of the bed of fire within the stove, so as to receive the full benefit of a low fire, and should it be desired to have the contents of the utensil cook slowly the supporting-ring may be adjusted toward the lower end of the utensil, so as to support the bottom thereof at a greater distance above the fire. Instead of having the inner marginal rim 5 formed by a plurality of separate wings, separated by V-shaped notches, said rim may be pressed from the material of the ring, so as to form a continuous rim.

What is claimed is—

The combination with a cylindrical pot, having a handle, of an external vertically-adjustable stove-engaging support, consisting of a flat outwardly-directed ring encircling the pot, and having an inner pendent marginal notched spring-rim frictionally embracing the pot, and an outer upstanding marginal flange spaced from the pot.

In testimony that I claim the foregoing as my own I have hereto affixed my signature in the presence of two witnesses.

ALICE WELKER.

Witnesses:
W. D. WELKER,
ISAAC W. ALTER.